Oct. 17, 1933.                G. A. MITCHELL                1,930,723
                          FILM MOVEMENT MECHANISM
                       Filed Jan. 11, 1932      2 Sheets-Sheet 1

Inventor
George A. Mitchell.
Attorney.

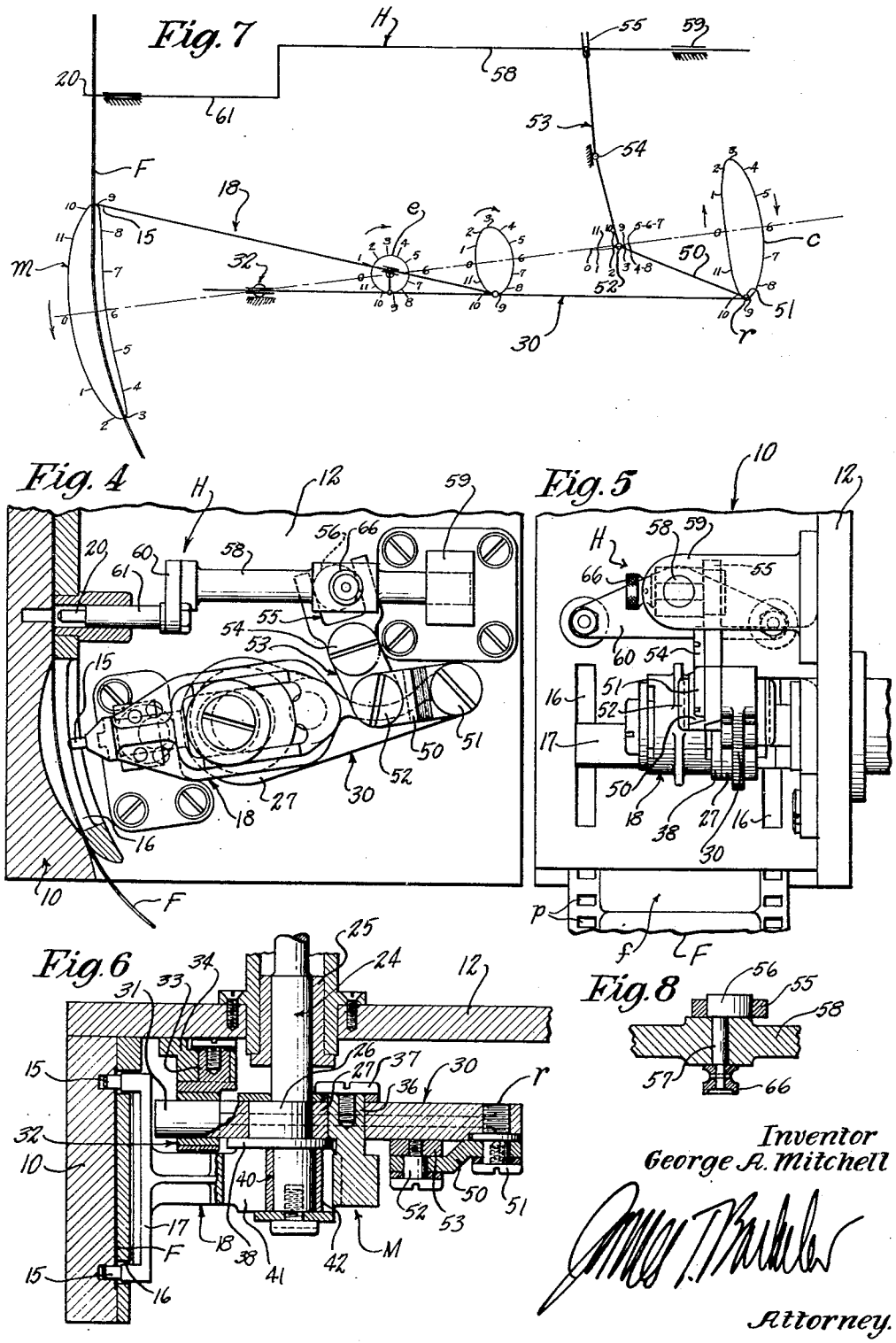

Patented Oct. 17, 1933

1,930,723

UNITED STATES PATENT OFFICE 1,930,723

FILM MOVEMENT MECHANISM

George A. Mitchell, Los Angeles, Calif., assignor to Mitchell Camera Corporation, West Hollywood, Calif., a corporation of Delaware Application January 11, 1932. Serial No. 585,836

12 Claims. (Cl. 88—18.4)

This invention relates generally to intermittent film movement mechanisms for motion picture cameras and the like, and more particularly to that type of film movement which may be characterized generally as involving an oscillative claw arm operable intermittently to engage and pull down the film, and film holding mechanism operable on the film alternately with the claw arm to hold the film in proper register with the exposure aperture while not being moved by the claw arm.

The present invention is an improvement upon the film movement disclosed in my U. S. Patents No. 1,851,400 issued March 29, 1932 and No. 1,849,880, issued March 15, 1932. The mechanism disclosed in said patents involved an oscillative claw arm reciprocated towards and away from the film by a primary driving arm pivoted to the rear end of the claw arm and itself driven by an eccentric on a rotating drive shaft, the driving and claw arms being constrained at their pivoted ends to substantially straight line movement toward and away from the film by a slide pivot mounting. The claw arm was then oscillated cooperatively with its reciprocation by means of a second eccentric on the drive shaft, the claw arm being arranged intermediate its ends to slide longitudinally and pivot on said second eccentric. This driving arrangement for the claw arm resulted in a certain point on the claw arm having a circular arc motion during the time the claw arm was disengaged from the film. There was then connected to the claw arm at said point of circular arc motion a motion transmitting arm which had at the center of that circular arc a pivot connection to motion transmitting means operating the film holding or register pin mechanism. By this means, during the time the claw arm was out of film engagement, the motion transmitting arm simply pivoted on the center of that circular arc and no motion was imparted to the register pins, then engaging the film. As the claw arm moved to engage the film, however, its point of circular arc motion left the path of said arc and so acted through the motion transmitting arm and the balance of the register pin operating means to withdraw the register pins from the film.

It may be stated as an object of the present invention to provide a movement having certain characteristics in common with my prior movement described above, but improved as regards motion characteristics in engaging, pulling down and withdrawing from the film; as regards the connective mechanism driving the pilot pin mechanism; and finally, as regards general features of design, as simplicity, compactness, reduction of accelerations, etc.

The present invention, in its preferred embodiment, involves, as does my prior movement, a primary driving arm operated by an eccentric on a drive shaft and provided to the rear of the eccentric with a pivotal connection to the rear end of the claw arm, and a second eccentric on said shaft and on which the claw arm slides and pivots. The driving arm, however, has a forwardly extending portion, that is, a portion extending toward the film, which portion has at its forward end a slide pivot mounting. This results in the point on the driving arm at which the claw arm is pivotally connected describing a path which may be described as a kind of ellipse, whose major axis is perpendicular to the center line of the claw arm, and this motion path is thus imparted to the rear end of the claw arm. The second eccentric on the drive shaft then forms a slide pivot for the claw arm, as in the prior movement, but the throw of this second eccentric is preferably small in the present case, both the reciprocation and the oscillation of the claw arm being derived principally from the larger elliptical movement given its rear end by the driving arm. The second eccentric, in the preferred form of the present movement, is thus of small throw, its function being principally to modify in a desired manner described hereinafter the motion characteristics of the claw arm rather than itself acting in the main to oscillate the claw arm, as in the prior movement. It will therefore be understood that although I may in many cases prefer an eccentric of small throw, as illustrated in the present application, that this eccentric might be given larger throw, thereby causing it to enter more largely into the swinging of the claw arm, or the eccentric might be reduced to zero throw, in which case it would be simply a fixed slide-pivot.

However, when this slide pivot is a rotating eccentric, the beginning of the pull-down stroke of the film engaging pins on the claw arm is retarded, so that the pins are permitted to move into engagement with the film perforations along straighter lines, as well as more fully into the perforations before substantially moving the film, the result being that "sawing" of the pins on the perforations during the pull-down is materially reduced. Further, when the slide-pivot is an eccentric the length of the claw arm for a given pull down distance is reduced, thus compacting the mechanism.

The driving arm is extended rearwardly from the point to which the claw arm is pivoted, and because of the nature of the operating and guiding means of said driving arm, has a substantially circular arc motion during the rearward half of the motion cycle of the arm, which period corresponds to the time the claw arm is out of film engagement. A motion transmitting link or arm is then pivoted to the driving arm at said point of circular arc motion, and the other end of said motion transmitting arm is given a pivotal connection, at the center of said circular arc, to the pilot pin operating means, in the manner suggested in my prior application Ser. No. 447,295 as outlined above. Thus during the return stroke of the claw arm, the rearward end of the driving arm describes a circular arc, and the motion transmitting arm connected to the rear end of said driving arm swings on its pivotal connection at the center of said arc, without causing movement of said pivotal connection; and at the time the claw arm engages the film, the rearward end of the claw-arm driving arm departs from said circular arc, and so causes the motion transmitting arm pivoted thereto to move longitudinally, whereupon its pivotal connection with the register pin mechanism departs from the center of said circular arc to cause operation of said mechanism to withdraw the register pins from the film.

The invention will be more fully understood from the following detailed description of a present preferred embodiment thereof, reference for this purpose being had to the accompanying drawings, in which:

Fig. 4 is a view similar to Fig. 2, but showing the register pin arm withdrawn so that the register pins are disengaged from the film at the same time the claw arm is withdrawn from the film;

Fig. 5 is a rear view of the movement, the parts being about in the position illustrated in Fig. 2;

Fig. 6 is a section taken as indicated by line 6—6 of Fig. 3;

Fig. 7 is a diagrammatic layout of the movement, showing the motion path of certain points in the mechanism; and Fig. 8 is a detail section taken on line 8—8 of Fig. 1.

Figure 1:
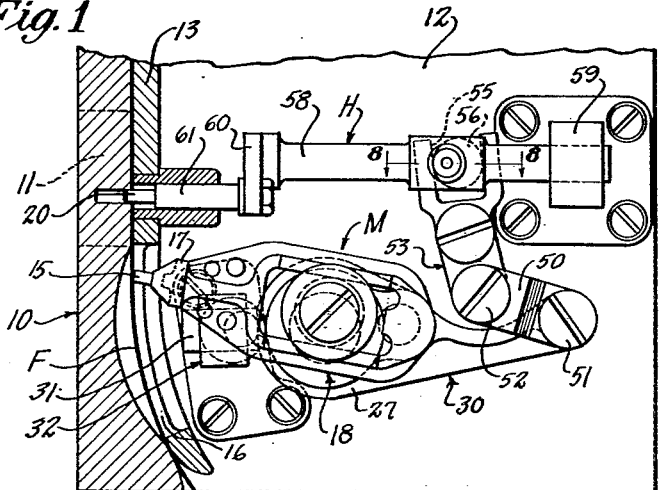
Fig. 1 is an elevation, partly in section, of my movement showing the claw arm in position just prior to engaging the film and the register pins just prior to withdrawing from the film.

In the drawings the numeral 10 designates a vertical aperture plate having an exposure aperture 11, and numeral 12 designates a vertical frame plate arranged at right angles to and extending rearwardly from an edge of plate 10, said plates 10 and 12 being adapted to be mounted in any suitable manner in the motion picture camera, not shown. Spaced rearwardly from aperture plate 10 and extending at right angles from plate 12 is a guide plate 13, between which and the aperture plate is the guideway for the film F. Below the exposure aperture curves rearwardly to conform to the curvature of motion of the film moving means, generally designated at M. The film is moved intermittently in the guide way by the film moving means, while during the period of dwell, that is, alternately with the periods of pull down, the film is engaged by the film holding or register mechanism H, which registers successive film frames $f$ with the exposure aperture 11.

The film is intermittently advanced by means of a pair of film moving claw pins 15, which are of proper size and are so spaced as to fit nicely in the film perforations, said pins extending through vertical slots 16 in plate 13 from the ends of a cross arm 17 mounted on the forward end of a swinging claw arm 18, said claw arm being operated as hereinafter described to cause its claw pins 15 to intermittently engage the film perforations $p$ and draw the film downwardly (or upwardly) through successive frame lengths.

Pilot pins 20, which are also of proper size and shape to fit nicely in the film perforations, are intermittently operated by mechanism H to engage the film alternately with the film moving pins, in such a manner that the pilot pins engage the film perforations just before the film moving pins are withdrawn therefrom, and are withdrawn from the film just after the film moving pins again engage the film perforations, so that the film is always engaged by one or the other of the pairs of pins.

The drive shaft for the movement is indicated at 24 (see Fig. 6), journaled in a bearing 25 mounted in plate 12. Spaced forwardly of bearing 25, shaft 24 has an eccentric 26 around which is a strap 27 formed in the intermediate portion of an eccentric operated driving arm 30. The forwardly extending portion 31 of said arm 30 is in the form of a cylindrical slide rod which is taken within and guided by a pivoted slide-bearing block 32, the pivot of said block being afforded by a stud 33 formed thereon and rotatively mounted in a bracket 34 mounted on plate 12. Rotation of eccentric 26 causes arm 30 to slide longitudinally in bearing block 32 and to oscillate on the axis of stud 33. It may here be mentioned that an eccentric 26 is here shown for the operation of arm 30 rather than a cam because it gives the circular arc motion later to be described, although in some cases a cam might be used.

Pivoted to arm 30 rearwardly of eccentric 26 is the rearward end of claw arm 18, the claw arm for this purpose being provided with a stud 36 rotatably mounted in arm 30. Claw arm 18 is held against separative movement from driving arm 30 by means of the enlarged head of a screw 37 set into the end of stud 36 while a flange 38 formed on drive shaft 24 outside of eccentric 26 serves properly to space the claw arm from arm 30.

Figure 7 is a single line diagram of the movement, showing the generation of the paths of points on arm 30 and the claw arm. The circle $e$ is the circle of eccentricity of eccentric 26, or in other words the circle of the equivalent crank. It will be noticed that the point on arm 30 to which the rear end of the claw arm is pivoted, is moved in the path of a kind of ellipse, whose major axis is pendicular to the center line of the movement.

Thus eccentric 26 operates arm 30 to move the rear end of the claw arm in the elliptic path described, the major axis of the ellipse representing the transverse movement of the claw arm obtained from arm 30, and the minor axis of the ellipse representing the total longitudinal movement of the claw arm. A slide pivot guide is then provided for the claw arm forwardly of its connection with arm 30, and this provision is here in the form of a pivot stud 40 on the outer end of drive shaft 24, the claw arm being formed intermediate its ends with a longitudinal guide slot 41 within which said stud 40 is taken. If desired, a bearing sleeve 42 may be provided on stud 40 to slide on the surfaces of slot 41. In the preferred form here illustrated, pivot stud 40 is located somewhat eccentrically with reference to the axis of shaft 24, the directions of eccentricity of eccentric 26 and pivot 40 being diametrically opposed, which arrangement results in improved operating characteristics, as to be more fully set forth hereinafter. Thus in the preferred embodiment pivot 40 is a crank pin or eccentric, although in certain aspects of the invention it need be only a pivot on which the claw arm may slide.

The complete operation of the claw arm in initially engaging the film, moving the film through the pull-down distance, and finally withdrawing from the film and returning to the first position, may now be understood. To move the film downwardly, drive shaft 24 is rotated in a right-handed direction as viewed in the drawings. This causes driving arm 30 to move the rear end of the claw arm right-handedly in the elliptic path described. The claw arm then slides and pivots on the stud or pin 40, and the claw pins on its forward end describe a motion path as illustrated at $m$. The effect of placing the slide pivot pin 40 eccentric with reference to the drive shaft 24, and 180 degrees opposed to eccentric 26, may be understood by analyzing the position of the claw arm in Figure 7, and considering its motion as it leaves said position to engage the film fully and to start the pull down. In Fig. 7 the rear end of the claw arm is at the lowermost point of its elliptic path, while the eccentric pin 40 is at its uppermost point. Now if pin 40 were stationary, progression of the claw arm pivot 36 upwardly on its elliptic path would immediately cause the claw arm to swing on its pivot to start its forward, film-engaging end immediately downwardly; but in the instant case, as the claw arm pivot 36 starts to rise in its elliptic path from the position indicated in Fig. 7, the right-handedly rotating slide pivot pin 40 moves a short distance rearwardly on the claw arm, in such a manner as to compensate the initial rise of the rearward end of the claw arm, which would otherwise start the forward end of the claw arm immediately downward. Thus, in final effect, the downward "pull-down" swing of the claw arm is delayed slightly, which gives the claw pins time to move more fully into the film perforations before the pull-down swing starts, and thereby reduces "sawing" of the pins on the film during the pull-down, as well as retarding somewhat the initial downward acceleration of the claw-arm.

Thus the claw arm may be considered to be reciprocated and oscillated from its rearward end by its elliptically moving pivot connection with the driving arm 30, the eccentricity of its slide pivot pin 40 serving in the manner described to improve the motion characteristics of the claw arm. This eccentricity also has the effect of lengthening the pull-down stroke, which means, for a standard pull-down distance, a desirable shortening of the claw arm.

It will be noticed from Fig. 7 that the path of a point $r$ on the arm 30 located a certain distance to the right of claw arm pivot 36 has a nearly perfect circular arc path $c$ during the down stroke of said arm (upstroke of the claw arm). A link or arm 50 is pivotally connected at one of its ends to arm 30 at said point $r$, as by means of a stud 51 set into arm 30 at point $r$ (see Fig. 6). The other end of arm 50, at a distance from point $r$ equal to the radius of the circular arc path $c$ of said point, is provided with a pivotal connection 52 to motion transmitting means operating the registering mechanism H, in the present case being connected to the lower arm of a lever 53 which is pivotally mounted on wall 12, as at 54. Lever 53 is arranged in such a manner that the pivotal connection 52 of its lower arm with arm 51 swings to a position at the center of the circular arc path $c$ of point $r$ when point $r$ is traversing said path $c$.

The upper arm of lever 53 is bifurcated, as at 55, to straddle an eccentric 56 on a stud 57 which is mounted for rotative adjustment in bore extending transversely through a horizontally disposed register pin carrying member 58. This member 58 is mounted at its rearward end in a slide bearing 59 so as to be capable of reciprocation towards and away from the film race, and its forward end carries a cross-arm 60 from the opposite end of which extend studs 61 carrying the register pins 20, the reciprocation of member 58 causing said pins 20 intermittently to engage the film in the film race.

Figure 2:
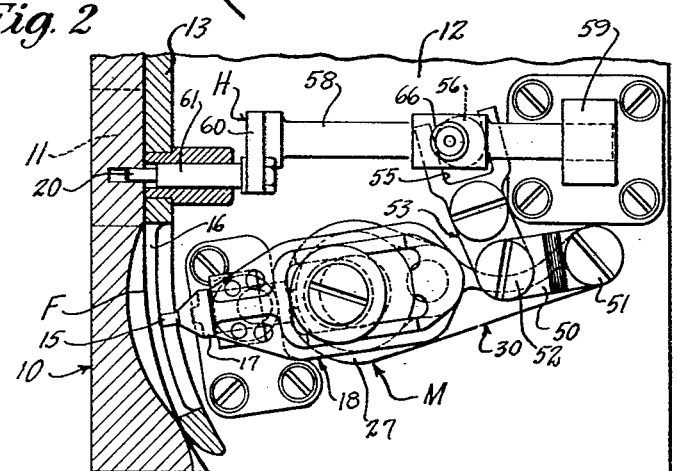
Fig. 2 is a view similar to Fig. 1, but showing the claw arm out of engagement with the film and mid-way in its return path, while the register pins are stationary and in engagement with the film.
Figure 3:
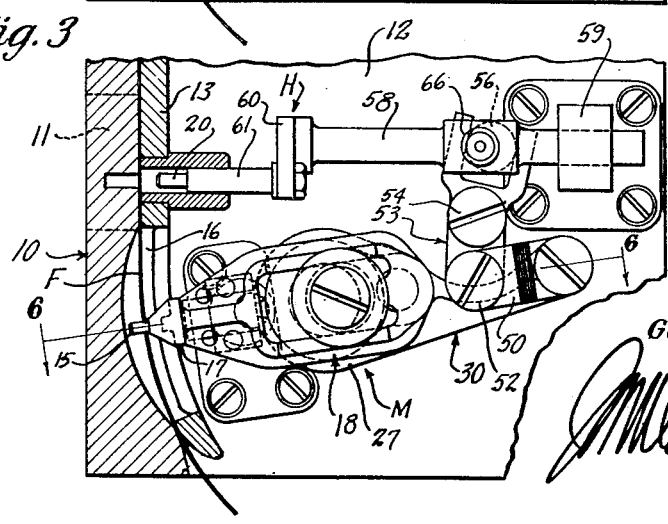
Fig. 3 is a view similar to Fig. 1, but showing the claw arm mid-way in its pull down stroke and the register pins fully withdrawn from the film.

During the down stroke of driving arm 30, which corresponds to the up or return stroke of claw arm 18, the pivotal connection point $r$ of arm 30 with arm 50 thus travels in the arc of a circle, the center of which coincides with the pivotal connection of the other end of arm 50 with the lower end of lever 53. Therefore, during this phase of movement, arm 50 simply pivots about its connection with lever 53 as a center and no motion is imparted to lever 53 and hence through member 58 to the register pins 20, which are then in stationary engagement with the film (see Fig. 2). As the driving arm 30 finally reaches the lower limit of its down stroke, and the claw arm simultaneously reaches the upper limit of its return stroke and moves into engagement with the film, however, the pivotal connection point $r$ of arm 30 with arm 50 departs from its circular arc back-stroke path and moves forwardly towards the film to follow its inner, upstroke path, thereby bodily moving arm 50 forwardly to cause a movement of lever 53 which retracts member 58 to withdraw the register pins 20 from the film. The pivotal connection between arm 50 and lever 53 follows the loci indicated for the duration of the claw arm pull-down stroke, maintaining the register pins out of engagement with the film until the claw arm reaches the lower limit of its down stroke and starts to withdraw from the film. At that time the pivotal connection $r$ of arm 30 with arm 50 is moving rearwardly to reach the upper end of its circular arc return-stroke path $c$, and in so doing moves arm 50 to bring its pivotal connection with lever 53 back to its locus at the center of that circular arc path. This operation brings lever 53 again to the position in which the member 58 operated thereby is in forward position with its register pins in engagement with the film. While arm 50 then swings downwardly with arm 30, the pivotal connection of said arm with lever 53 then again remains stationary to hold the register pin mechanism in stationary engagement with the film, as previously described.

Thus the effect of these provisions is that the register pins are operated to engage the film just before the claw pins are withdrawn therefrom, and remain in stationary engagement with the film while the claw arm is moving upwardly on its return stroke, being moved to withdraw from the film just after the claw pins again engage the film.

It will be noticed that the film is normally always engaged either by the claw pins or the register pins. To thread the movement, knurled thumb piece 66 on the forward end of eccentric stud 57 is operated to rotate eccentric 56 between the bifurcations 55 of lever 53, in such a manner as to cause movement of stud 57 rearwardly. This operation causes retraction of member 58 to withdraw the register pins from the film. Both the claw and the register pins are then withdrawn from the film race (see Fig. 4), and the movement can be threaded, after which return rotation of thumb piece 66 brings the movement back to the operative position shown in Fig. 2. Stud 57 is mounted in member 58 with a nice turning fit, so that it can be easily rotated manually, but with sufficient tightness that it will maintain its position during operation of the movement.

It will be understood that various changes in design, structure and arrangement may be made in the movement without departing from the spirit and scope of the claims appended hereto. And in this connection it may be mentioned that in the claims the expression eccentric is used in a generic sense to include within its purview all such fundamentally similar elements as eccentrics, cranks or rotational cams, any one of which might be used in a specific design for the operation of the movement.

I claim:—

1. In a film movement, the combination of a frame providing a film guideway, a rotatable drive shaft journalled in said frame rearwardly of said guideway, an eccentric on said drive shaft, an oscillatory arm operated intermediate its ends by said eccentric, a slide-pivot guide between said eccentric and said guideway for the forward end of said oscillatory arm, a claw arm pivotally connected at its rearward end to said oscillatory arm at a point thereon rearwardly of said eccentric, in such a manner that the rearward end of the claw arm is moved in an elliptical path, and a slide-pivot guide means for an intermediate portion of said claw-arm located directly opposite said drive shaft.

2. In a film movement, the combination of a frame providing a film guideway, a rotatable drive shaft journalled in said frame rearwardly of said guideway, an eccentric on said drive shaft, an oscillatory arm operated by said eccentric, a slide-pivot guide between said eccentric and said guideway for the forward end of said oscillatory arm, a claw arm pivotally connected at its rearward end to said oscillatory arm, and another eccentric on said drive shaft, the intermediate portion of said claw arm being adapted to slide longitudinally and to pivot on said last mentioned eccentric.

3. In a film movement, the combination of a frame providing a film guideway, a rotatable drive shaft journalled in said frame rearwardly of said guideway, an eccentric on said drive shaft, an oscillatory arm operated by said eccentric, a slide-pivot guide between said eccentric and said guideway for the forward end of said oscillatory arm, a claw arm pivotally connected at its rearward end to said oscillatory arm, and another eccentric on said drive shaft opposed by 180° to the first mentioned eccentric, the intermediate portion of said claw arm being adapted to slide longitudinally and to pivot on said last mentioned eccentric.

4. In a film movement, the combination of a frame providing a film guideway, a rotatable drive shaft journalled in the said frame rearwardly of said guideway, an eccentric on said drive shaft, an oscillatory arm operated intermediate its ends by said eccentric a slide-pivot guide between said eccentric and said guideway for the forward end of said oscillatory arm, a claw arm pivotally connected at its rearward end to said oscillatory arm at a point thereon rearwardly of said eccentric, in such a manner that the rearward end of the claw arm is moved in an elliptical path, and another eccentric on said drive shaft, the intermediate portion of said claw arm being adapted to slide longitudinally and to pivot on said last mentioned eccentric.

5. In a film movement, the combination of a frame providing a film guideway, a rotatable drive shaft journalled in said frame rearwardly of said guideway, an eccentric on said drive shaft, an oscillatory arm operated intermediate its ends by said eccentric, a slide-pivot guide between said eccentric and said guideway for the forward end of said oscillatory arm, a claw arm pivotally connected at its rearward end to said oscillatory arm at a point thereon rearwardly of said eccentric, in such a manner that the rearward end of the claw arm is moved in an elliptical path, and another eccentric on said drive shaft, opposed by 180° to the first mentioned eccentric, the intermediate portion of said claw arm being adapted to slide longitudinally and to pivot on said last mentioned eccentric.

6. In a film movement, the combination of a frame providing a film guideway, a rotatable drive shaft journalled in said frame, an eccentric on said drive shaft, an oscillatory arm operated by said eccentric, and a slide-pivot guide for one end of said arm, all in such manner that a point on said arm moves alternately in a substantially circular arc path and in a path out of said circular arc, a claw arm operatively connected to said oscillatory arm to engage and pull down the film by virtue of the motion of the oscillatory arm while said point is out of said circular arc path, and to disengage the film and return by virtue of the motion of said arm while said point is in said circular arc path, a film holding member adapted for engagement with the film alternately with the claw arm, and motion transmitting means between said oscillatory arm and said film holding member, said motion transmitting means including a member pivotally connected to said oscillatory arm at said point of circular arc motion and having another pivotal connection lying substantially at the center of said circular arc.

7. In a film movement, the combination of a frame providing a film guideway, a rotatable drive shaft journalled in said frame rearwardly of said guideway, an eccentric on said drive shaft, an oscillatory arm operated intermediate its ends by said eccentric, and a slide pivot guide for the forward end of said arm, all in such manner that a point on the rearward end of said arm moves alternately in a substantially circular arc path and in a path out of said circular arc, a claw arm operatively connected to said oscillatory arm to engage and pull down the film by virtue of the motion of the oscillatory arm while said point is out of said circular arc path, and to disengage the film and return by virtue of the motion of said arm while said point is in said circular arc path, a film holding member adapted for engagement with the film alternately with the claw arm, and motion transmitting means between said oscillatory arm and said film holding member, said motion transmitting means including a member pivotally connected to said oscillatory arm at said point of circular arc motion and having another pivotal connection lying substantially at the center of said circular arc.

8. In a film movement, the combination of a frame providing a film guideway, a rotatable drive shaft journalled in said frame rearwardly of said guideway, an eccentric on said drive shaft, an oscillatory arm operated intermediate its ends by said eccentric, and a slide pivot guide for the forward end of said arm, all in such manner that a point on the rearward end of said arm moves alternately in a substantially circular arc path and in a path out of said circular arc, a claw arm pivoted at its rearward end to said oscillatory arm at a point to the rear of said eccentric, a slide-pivot guide for an intermediate portion of said claw arm, whereby said claw arm is operated by the oscillatory arm to engage and pull down the film during the motion of said oscillatory arm while its point of circular arc motion is out of said circular arc, and to disengage the film and return during the motion of said oscillatory arm while said point is traversing said circular arc, a film holding member adapted for engagement with the film alternately with the claw arm, and motion transmitting means between said oscillatory arm and said film holding member, said motion transmitting means including a member pivotally connected to said oscillatory arm at said point of circular arc motion and having another pivotal connection lying substantially at the center of said circular arc.

9. In a film movement, the combination of a frame providing a film guideway, a rotatable drive shaft journalled in said frame rearwardly of said guideway, an eccentric on said drive shaft, an oscillatory arm operated intermediate its ends by said eccentric, and a slide pivot guide for the forward end of said arm, all in such manner that a point on the rearward end of said arm moves alternately in a substantially circular arc path and in a path out of said circular arc, a claw arm pivoted at its rearward end to said oscillatory arm at a point to the rear of said eccentric, a second eccentric on said shaft on which the intermediate portion of the claw arm slides and pivots, whereby said claw arm is operated by the oscillatory arm to engage and pull down the film during the motion of said oscillatory arm while its point of circular arc motion is out of said circular arc, and to disengage the film and return during the motion of said oscillatory arm while said point is traversing said circular arc, a film holding member adapted for engagement with the film alternately with the claw arm, and motion transmitting means between said oscillatory arm and said film holding member, said motion transmitting means including a member pivotally connected to said oscillatory arm at said point of circular arc motion and having another pivotal connection lying substantially at the center of said circular arc.

10. In a film movement, the combination of a frame providing a film guideway, a rotatable drive shaft journalled in said frame, an eccentric on said drive shaft, an oscillatory arm operated by said eccentric, and a slide-pivot guide for one end of said arm, all in such manner that a point on said arm moves alternately in a substantially circular arc path and in a path out of said circular arc, a claw arm operatively connected to said oscillatory arm to engage and pull down the film by virtue of the motion of the oscillatory arm while said point is out of said circular arc path, and to disengage the film and return by virtue of the motion of said arm while said point is in said circular arc path, a film holding member adapted for engagement with the film alternately with the claw arm, and operative interconnecting means between said film holding member and said oscillatory arm, said means including a movable motion transmitting element having a connection pivot whose loci include a locus substantially at the center of said circular arc, and a connecting member pivotally connected to the oscillatory arm at said point of circular arc motion, and, at a distance equal to the radius of said circular arc, connected with the connection pivot of said motion transmitting element.

11. In a film movement, the combination of a frame providing a film guideway, a rotatable drive shaft journalled in said frame rearwardly of said guideway, an eccentric on said drive shaft, an oscillatory arm operated intermediate its ends by said eccentric, and a slide pivot guide for the forward end of said arm, all in such manner that a point on the rearward end of said arm moves alternately in a substantially circular arc path and in a path out of said circular arc, a claw arm operatively connected to said oscillatory arm to engage and pull down the film by virtue of the motion of the oscillatory arm while said point is out of said circular arc path, and to disengage the film and return by virtue of the motion of said arm while said point is in said circular arc path, a film holding member adapted for engagement with the film alternately with the claw arm, and operative interconnecting means between said film holding member and said oscillatory arm, said means including a movable motion transmitting element having a connection pivot whose loci include a locus substantially at the center of said circular arc, and a connecting member pivotally connected to the oscillatory arm at said point of circular arc motion and, at a distance equal to the radius of said circular arc, connected with the connection pivot of said motion transmitting element.

12. In a film movement, the combination of a frame providing a film guideway, a rotatable drive shaft journalled in said frame rearwardly of said guideway, an eccentric on said drive shaft, an oscillatory arm operated intermediate its ends by said eccentric, and a slide pivot guide for the forward end of said arm, all in such manner that a point on the rearward end of said arm moves alternately in a substantially circular arc path and in a path out of said circular arc, a claw arm pivoted at its rearward end to said oscillatory arm at a point to the rear of said eccentric, a slide-pivot guide for an intermediate portion of said claw arm, whereby said claw arm is operated by the oscillatory arm to engage and pull down the film during the motion of said oscillatory arm while its point of circular arc motion is out of said circular arc, and to disengage the film and return during the motion of said oscillatory arm while said point is traversing said circular arc, a film holding member adapted for engagement with the film alternately with the claw arm, and operative interconnecting means between said film holding member and said oscillatory arm, said means including a movable motion transmitting element having a connection pivot whose loci include a locus substantially at the center of said circular arc, and a connecting member pivotally connected to the oscillatory arm at said point of circular arc motion and, at a distance equal to the radius of said circular arc, connected with the connection pivot of said motion transmitting element.

GEORGE A. MITCHELL.